US008609220B2

(12) United States Patent
Summers et al.

(10) Patent No.: US 8,609,220 B2
(45) Date of Patent: Dec. 17, 2013

(54) SHEAR COMPLIANT HEXAGONAL MESO-STRUCTURES HAVING HIGH SHEAR STRENGTH AND HIGH SHEAR STRAIN

(75) Inventors: Joshua D. Summers, Clemson, SC (US); Georges M. Fadel, Clemson, SC (US); Jaehyung Ju, Sungnam (KR); John Ziegert, Charlotte, NC (US)

(73) Assignees: Compagnie Generale des Etablissements Michelin (FR); Michelin Recherche et Technique S.A. (CH)

( * ) Notice: Subject to any disclaimer, the term of this patent is extended or adjusted under 35 U.S.C. 154(b) by 99 days.

(21) Appl. No.: 13/077,611

(22) Filed: Mar. 31, 2011

(65) Prior Publication Data

US 2011/0250383 A1 Oct. 13, 2011

Related U.S. Application Data

(60) Provisional application No. 61/321,915, filed on Apr. 8, 2010.

(51) Int. Cl.
*B32B 3/12* (2006.01)
*B60C 7/00* (2006.01)
*B60C 7/10* (2006.01)

(52) U.S. Cl.
USPC ........... 428/116; 428/593; 428/680; 152/246; 152/251; 152/310

(58) Field of Classification Search
USPC .......... 428/116, 593; 152/323, 329, 251, 246, 152/310
See application file for complete search history.

(56) References Cited

U.S. PATENT DOCUMENTS

| 1,440,974 | A | 1/1923 | Dornburgh | |
|---|---|---|---|---|
| 7,160,621 | B2 * | 1/2007 | Chaudhari et al. | 428/412 |
| 2006/0113016 | A1 * | 6/2006 | Cron et al. | 152/11 |
| 2006/0192465 | A1 * | 8/2006 | Kornbluh et al. | 310/800 |
| 2006/0208135 | A1 * | 9/2006 | Liguore et al. | 244/117 R |
| 2007/0031667 | A1 * | 2/2007 | Hook et al. | 428/373 |
| 2011/0030866 | A1 * | 2/2011 | Fadel et al. | 152/311 |
| 2011/0240190 | A1 * | 10/2011 | Summers et al. | 152/151 |
| 2011/0240194 | A1 * | 10/2011 | Summers et al. | 152/246 |
| 2012/0060991 | A1 * | 3/2012 | Mun et al. | 152/323 |

FOREIGN PATENT DOCUMENTS

WO    WO 9101186 A   *   2/1991

OTHER PUBLICATIONS

Ju et al. "Flexible cellular solid spokes of a non-pneumatic tire." Jan. 2, 2012. Composite Structures 94 (2012). 2285-2295.*
Compliant Hexagonal Meso-Structures Having Both High Shear Strength and High Shear Strain; IDETC/CIE Conference; Aug. 15-18, 2010; Montreal, Quebec, Canada.

* cited by examiner

*Primary Examiner* — David Sample
*Assistant Examiner* — Nicholas W Jordan
(74) *Attorney, Agent, or Firm* — E. Martin Remick

(57) ABSTRACT

A shear layer for a shear band that is used in a tire is provided that has multiple cells or units having an auxetic configuration and that are constructed from aluminum or titanium alloys. The cells may have an angle of −10°.

4 Claims, 9 Drawing Sheets

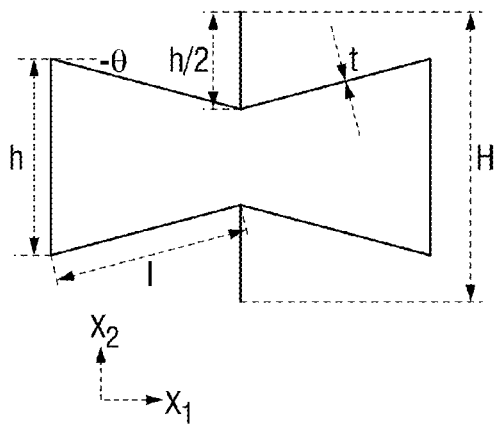
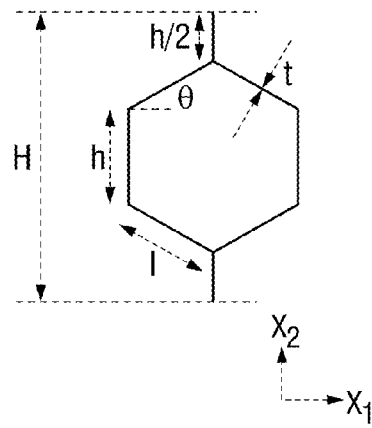

FIG. 1A   FIG. 1B

GIVEN:
- TARGET PROPERTY: EFFECTIVE SHEAR MODULUS, $G^*_{12}$ (=10MPa)
- PROPERTY OF CONSTITUENT MATERIAL: ALUMINUM ALLOY (7075-T6) - $E_S, \nu_S$ AND $\sigma_{YS}$
- GEOMETRY: LAYER HEIGHT, H (=12.7MM) AND THE NUMBER OF VERTICAL CELL, N (=1)

FIND:
- HONEYCOMB GEOMETRY: $t, h, l,$ AND $\theta$

SATISFY:

CONSTRAINTS:
- $t \geq 0.1$MM (MANUFACTURING CONSTRAINT)
- $h > 2l\sin\theta$ (NEGATIVE CELL ANGLE CONSTRAINT)
- RELATIVE DENSITY MUST BE GREATER THAN 0.07 TO AVOID BUCKLING: $0.07 \leq \rho^*/\rho_S$
- $t/l \leq 0.25$
- $t/h \leq 0.25$
- $-75° \leq \theta \leq 75°$ GOALS:
- MAXIMIZE THE EFFECTIVE SHEAR YIELD STRENGTH, $(\tau^*_{PL})_{12}$
- MAXIMIZE THE EFFECTIVE SHEAR YIELD STRAIN, $(\gamma^*_{PL})_{12}$

MINIMIZE:
- RELATIVE DENSITY OF HONEYCOMBS

FIG. 2

SHEAR COMPLIANT HEXAGONAL MESO-STRUCTURES HAVING HIGH SHEAR STRENGTH AND HIGH SHEAR STRAIN

PRIORITY CLAIM

This application claims the benefit of previously filed U.S. Provisional Patent Application entitled "Shear Compliant Hexagonal Meso-Structures Having High Shear Strength and High Shear Strain", assigned U.S. Ser. No. 61/321,915, filed Apr. 8, 2010, and which is incorporated herein by reference in its entirety for all purposes.

BACKGROUND OF THE INVENTION

Motivated by the inventors' previous application on flexible honeycomb design with negative. Poisson's ratio (NPR) often called 'auxetic' [1], more geometric options of hexagonal honeycomb meso-structures are explored including honeycomb having NPR. While designing an effective shear modulus, e.g., $G_{12}^*$ of 10 MPa, of hexagonal honeycombs, we are searching honeycomb geometry such as the cell wall thickness, t, the vertical cell length; h, the inclined cell length, l, and the cell angle, θ. Using an aluminum alloy (7075-T6) as the constituent material, the in-plane linear elastic honeycomb model is employed for a numerical parametric study and the honeycomb design. The re-entrant geometry affects the flexible property of NPR honeycombs, resulting in an effective shear yield strength, $(T^*_{pl})_{12}$ of 1.7 MPa and an effective shear yield strain, $(\gamma^*_{pl})_{12}$ of 0.17 when they are designed to have a $G_{12}^*$ of 10 MPa.

Hexagonal honeycombs are commonly used cellular materials employed in various applications in the design of light weight structures. For example, the in-plane moduli of hexagonal honeycombs have been successfully investigated with the cell wall bending model, which is called cellular material theory (CMT) [2,3]. There are other analytical and numerical models to describe in-plane effective properties of honeycombs in the literature; a refined cell wall's bending model by adding a beam's stretching and hinging motion [4], a model with the energy method [5], a refined model with round shape at cell edges [6], and a model using the homogenization method [7]. In-plane mechanical properties with different cell types—square, hexagonal, triangle, mixed squares and triangles, diamond—were investigated by Wang and McDowell [8].

Compared to the fundamental studies on cellular solids, their practical applications have been limited to the development of high stiffness-to-weight ratio and high impact energy absorption induced sandwich cores for aircraft and aerospace structures, which are related to the honeycombs' out of plane properties [9-13].

Triangular, Kagome, and diamond cell honeycombs are known to extension dominated cell structures, which is good for a high modulus structural design. On the other hand, square and hexagonal cell honeycombs are known to bending dominated structures, which is good for a flexible structural design [8]. Hexagonal cell structures are known to be flexible in both axial and shear directions [3]. Moreover, hexagonal honeycombs can be easily tailored to have an effective negative Poisson's ratio with negative internal cell angles. This induces the flexible property of the cellular structures due to their re-entrant geometry which is known to increase the buckling loading of honeycombs [4]. Therefore, the hexagonal geometry has a potential to be designed as compliant structures.

Our previous application that focused on tailoring dual target properties, e.g., effective shear modulus and effective shear yield strain, with cellular structures shows a possibility in, building flexible cellular structures [15, 16]. Motivated by our recent findings on the shear compliant hexagonal honeycombs for the shear band component of a lunar rover wheel, we are seeking more geometric and material options for the flexible hexagonal honeycomb design. This study will also be applicable in the aerospace morphing wing technology in which some researchers already began to use the in-plane flexibility with honeycombs [17, 18]. The use of re-entrant cellular structures as micro-actuators and displacement amplifiers has been suggested in the micro-electro-mechanical-system (MEMS) design [19].

The inventors are challenged with developing cellular meso-structures that mimic elastomers' shear properties. In this application, while pursuing an elastomer's shear modulus, 10 MPa, the inventors investigate the effect of various hexagonal geometries on the effective shear strains with an aluminum alloy (7075-T6).

SUMMARY OF THE INVENTION

The present invention includes a shear layer for use in a shear band that has an auxetic honeycomb configuration.

In some embodiments, the honeycomb configuration is made from an aluminum alloy such as 7075-T6. In other embodiments, the honeycomb configuration is made from a Titanium alloy such as 6Al-4V.

In other embodiments, the auxetic honeycomb configuration has angle θ of −10°.

The present invention also encompasses a tire that uses a shear layer that includes a honeycomb structure that has an auxetic structure in any of the embodiments described above.

Additional embodiments of the present subject matter, not necessarily expressed in the summarized section, may include and incorporate various combinations of aspects of features, components, or steps referenced in the summarized objects above, and/or other features, components, or steps as otherwise discussed in this application. Those of ordinary skill in the art will better appreciate the features and aspects of such embodiments, and others, upon review of the remainder of the specification.

BRIEF DESCRIPTION OF THE DRAWINGS

A full and enabling disclosure of the present subject matter, including the best mode thereof, directed to one of ordinary skill in the art, is set forth in the specification, which makes reference to the appended figures, in which:

FIG. 1 shows the Unit cell configuration for (a) Auxetic and (b) Conventional Hexagonal Honeycombs.

FIG. 2 is a Word formulation of the shear compliant honeycomb design.

DETAILED DESCRIPTION OF THE REPRESENTATIVE EMBODIMENTS

Figure 3A:
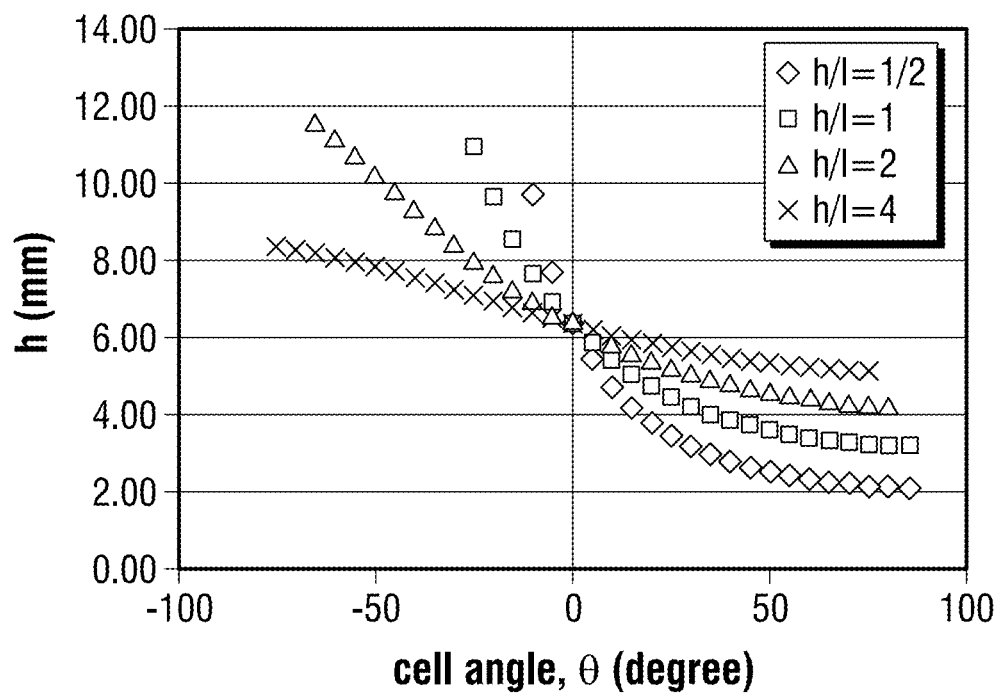
FIG. 3 shows graphs showing the available Dimensions of h and l under the honeycomb design constraints.

When designing cellular meso-structures for structural stability, cell geometry should be designed based on target effective properties, e.g., effective moduli. We first set design target; a shear property of elastomer, e.g., a $G_{12}^*$ of 10 MPa.

Compliant hexagonal geometries are investigated using the cellular materials theory (CMT) because they easily handle positive to negative Poisson's ratios by changing cell angles, which is good for a parametric study. Due to the high cost of manufacturing cellular structures with various geometric parameters, a numerical parametric study of an analytical model is preferred to an experimental one at the initial stage of design. Therefore, a numerical parametric study with a developed analytical model is employed in the present study to provide a direction for a prototype design.

Reference will now be made in detail to embodiments of the invention, one or more examples of which are illustrated in the Figures. Each example is provided by way of explanation of the invention, and not meant as a limitation of the invention. For example, features illustrated or described as part of one embodiment can be used with another embodiment to yield still a third embodiment. It is intended that the present invention include these and other modifications and variations. It should be noted that for the purposes of discussion, only half of the exemplary tire embodiments may be depicted in one or more of the figures. Reference numbers are used in the Figures solely to aid the reader in identifying the various elements and are not intended to introduce any limiting distinctions among the embodiments. Common or similar numbering for one embodiment indicates a similar element in the other embodiments. One of ordinary skill in the art, using the teachings disclosed herein, will understand that the same or substantially similar features are repeated on both sides of the tire.

DETAILED DESCRIPTION

Brief Review of Linear Elastic Shear Deformation of Honeycombs and Plastic Collapse Unit cell geometries with conventional and NPR hexagonal honeycombs are shown in FIG. 1. The critical geometric parameters include the cell angle (θ), the vertical cell length (h), the inclined cell length (l), and the wall thickness (t).

CMT has been validated with experimental and numerical work, and describes the honeycombs elastic behavior well including configurations with negative cell angles [2-6]. In plane effective shear modulus from CMT is given by [3]:

$$G_{12}^* = E_s \left(\frac{t}{l}\right)^3 \frac{\left(\frac{h}{l} + \sin\theta\right)}{\left(\frac{h}{l}\right)^2 \left(1 + 2\frac{h}{l}\right)\cos\theta} \quad (1)$$

where $E_s$ is the Young's modulus of the cell wall material. Not many reports on analytical and numerical models to provide a yield point of honeycombs as a function of materials' strength and nonlinear deformation of honeycombs are available in the literature likely due to the complexity needed to handle geometric and material nonlinearity. Nonlinear constitutive relations of in-plane tensile and shear behaviors of regular honeycombs were developed using the elastic bending theory of beams in large deflection [19]. CMT assumes that honeycombs start collapsing plastically when the bending moment in the cell walls reaches the fully plastic moment and provides a yield point of honeycombs as a function of materials' strength over a material's linear elastic range. Maximum in-plane effective strains at which the honeycomb meso-structures can tolerate deformation without local cell wall failure when subjected to in-plane shear loading are given by [3]:

$$(\gamma_{pl}^*)_{12} = \frac{1}{4} \frac{\sigma_{ys}}{G_{12}^*} \left(\frac{t}{l}\right)^2 \frac{1}{\frac{h}{l}\cos\theta} \quad (2)$$

where $\sigma_{ys}$ is the yield strength of the cell wall material. It should be noted that the analytical expressions for the effective properties and maximum effective strains are restricted to be used in the linear elastic range.

The relative density is often used for the cellular materials design. The relative density of hexagonal honeycombs is given by [3], $$\frac{\rho^*}{\rho_s} = \frac{\frac{t}{l}\left(\frac{h}{l} + 2\right)}{2\cos\theta\left(\frac{h}{l} + \sin\theta\right)} \quad (3)$$

Design of Honeycombs at a Given Meso-Structural Dimension

For a shear compliant structural design of honeycomb meso-structures, the layer height, H, of a honeycomb sample is chosen to be 0.5 inch (12.7 mm) in the x2 direction as shown in FIG. 1. This aligns with other design considerations of the structure that are outside the scope of this paper. Further, it allows for a refined design space in which to explore the influences of the defined honeycomb parameters on the effective mesa-structural properties.

For a given honeycomb of the layer height, H, and cell angle, θ, the cell height h is defined as $$h = \frac{H}{2N \cdot \left(1 + \frac{\sin\theta}{\alpha}\right)} \quad (4)$$

where N is the number of unit cells in the vertical direction (the x2 direction in FIG. 1) and $\alpha=h/l$. In the present study, N is restricted to be 1 for convenience.

For negative cell angles, there is a geometric constraint such as $$h \geq 2l \sin\theta \quad (5)$$

There are additional constrains for the honeycomb design. For example, the simple beam theory is valid for t/l or t/h<¼ [3]. Related to the manufacturing limitation, a minimum cell wall thickness should be set: in this study, the minimum cell wall thickness of 7075-T6 is set to be 0.1 mm. Cell angles also have a limitation to avoid collision with adjacent cell walls: we set the range of the cell angle as $-75° \leq \theta \leq 75°$. To avoid elastic nonlinear deformation such as buckling, the relative density should be high enough. For example, Thompson et al. used the minimum criteria of the relative density of 0.07, which we use in this study [21]. The goal of the shear compliant honeycomb design are to maximize both the effective shear yield strength, $(T^*_{pl})_{12}$, and the effective shear yield strain, $(Y_{pl})_{12}$, of hexagonal honeycomb meso-structures. The detailed formulation for the shear compliant honeycomb design is shown in FIG. 2.

Figure 3B:
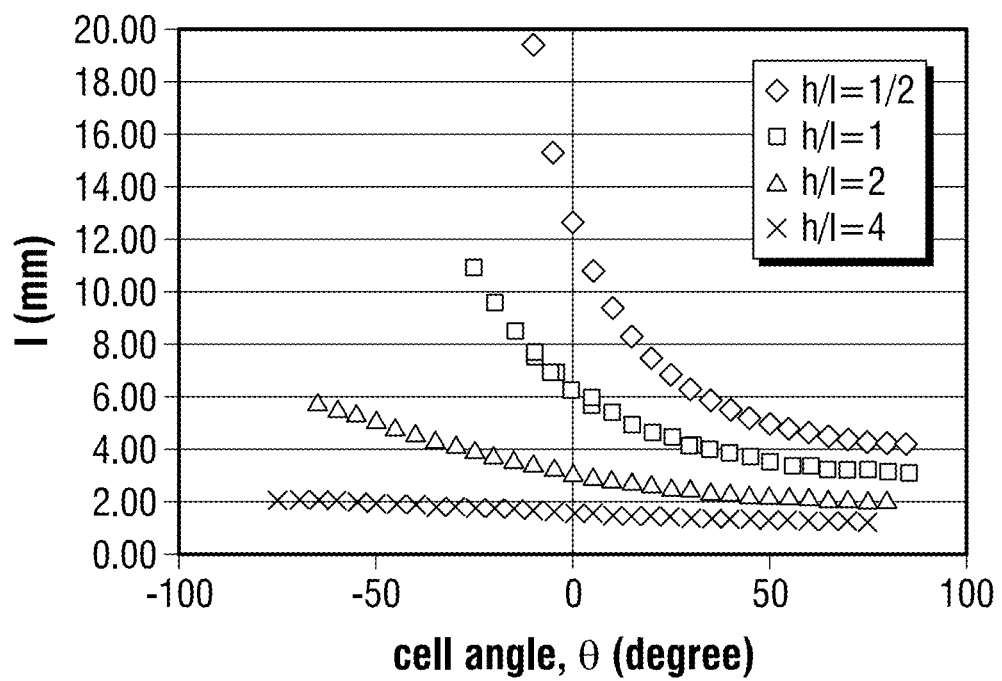
Figure 3C:
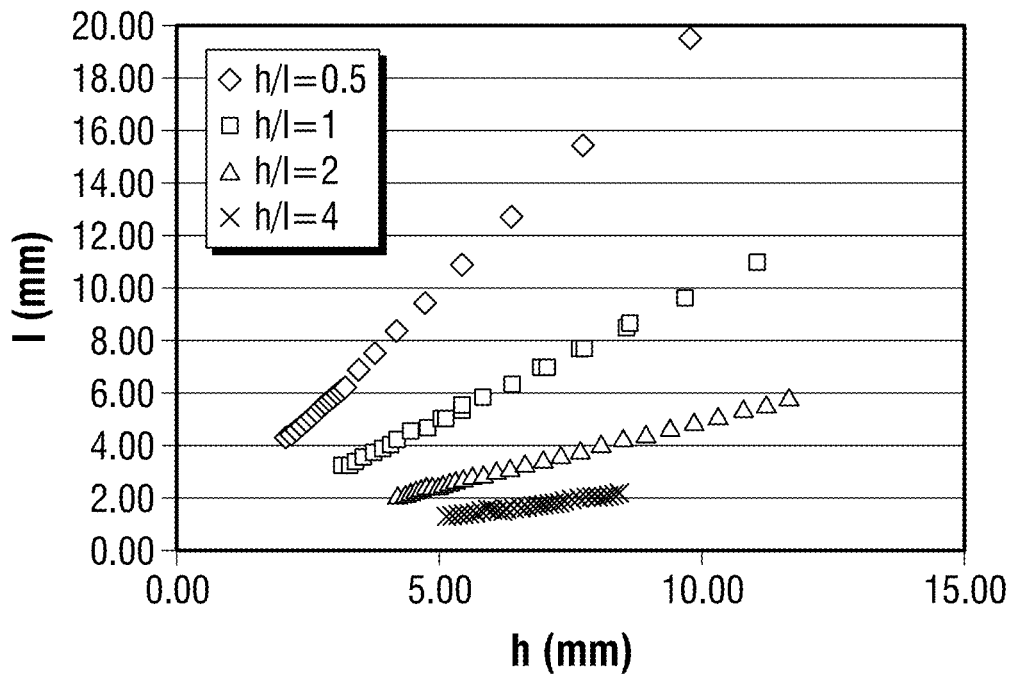

Available dimensions of h and l satisfying both Equations (3) and (4) are shown in FIG. 3 as a function of $\alpha$ and $\theta$. For $\alpha = \frac{1}{2}, 1, 2,$ and 4,:
i) $-15° < \theta < 90°$, $2.12 < h < 9.73$ and $4.24 < l < 19.46$
ii) $-30° < \theta < 90°$, $3.18 < h < 11.0$ and $3.18 < l < 11.0$
iii) $-90° \theta < 90°$, $4.24 < h < 12.65$ and $2.12 < l < 6.33$
iv) $-90° < \theta < 90°$, $5.08 < h < 8.46$ and $1.27 < l < 2.11$, respectively.

The corresponding unit cell geometries are shown in Table 1 as a function of cell angles for $\alpha = 1/2, 1, 2,$ and 4.

As base materials of compliant honeycomb meso-structures, an aluminum alloy, Al-7075-T6 and a titanium alloy, Ti-6Al-4V are selected because they have higher yield strains than conventional metals. Mechanical properties of Al-7075-T6 and Ti-6Al-4V are shown in Table 2.

TABLE 2

Mechanical Properties of Al-7075-T6 and Ti-6Al-4V [21]

| Base Materials | $\rho_s$ [kg/m³] | $E_s$ [GPa] | $G_1$ [GPa] | $\nu$ | $\sigma_{yr}$ [MPa] | $\epsilon_{ys}$ |
|---|---|---|---|---|---|---|
| Al-Alloy (7075-T6) | 2800 | 72 | 27 | 0.33 | 503 | 1.87% |

These two materials are selected for prototyping and experimental validation purposes. The physical validation of this work will be presented in other work.

TABLE 1

Geometries of honeycombs as a function of cell angles and $\alpha(=h/l)$

| cell angle, ($\theta$) | −60° | −30° | 0° | 30° | 60° |
|---|---|---|---|---|---|
| $\alpha = \frac{1}{2}$ | | ($\theta = 10'$) | | | |
| $\alpha = 1$ | | | | | |
| $\alpha = 2$ | | | | | |
| $\alpha = 4$ | | | | | |

RESULTS AND DISCUSSION

Maximum Effective Shear Strain of Honeycomb Meso-Structures

In this study, honeycomb meso-structures are designed to have an elastomer's shear modulus of 10MPa. The maximum effective shear strains, $(Y_{pl}^*)_{12}$ of honeycombs are shown in FIG. 3. At negative cell angles, $(Y_{pl}^*)_{12}$ shows a high value; about 0.2 and 0.17 for $\alpha=2$ and 4, respectively, at $\theta=-75°$ as shown in FIG. 3(a).

Figure 4A:
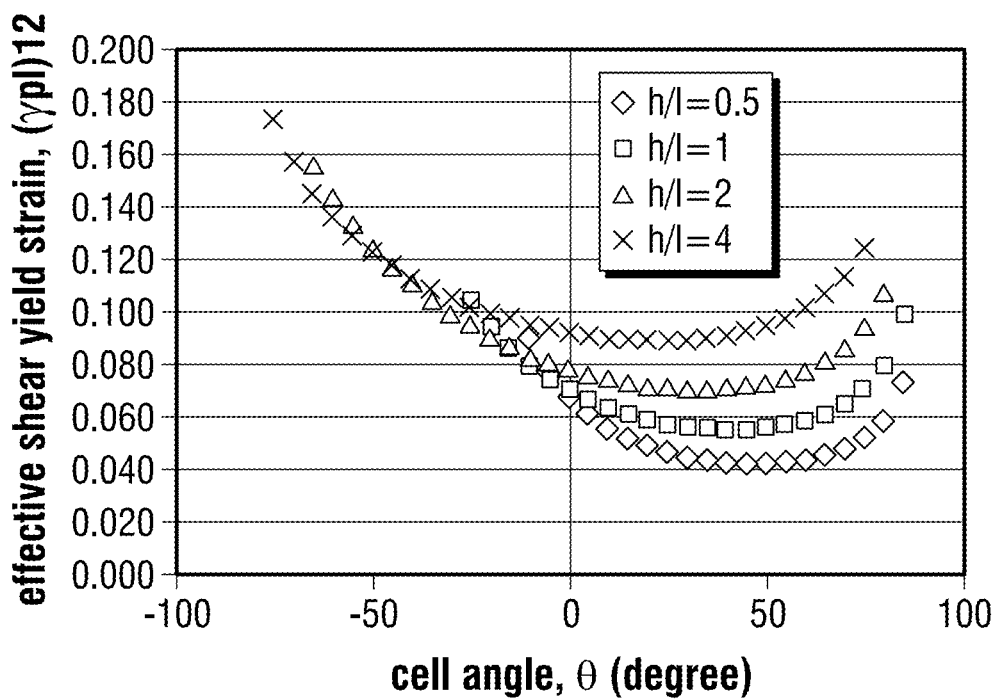
FIG. 4 depicts graphs showing the Maximum effective shear strains (a) and corresponding cell wall thicknesses (b) of 7075-T6 honeycombs when designed to a $G_{12}^*$ of 10 MPa.
Figure 4B:
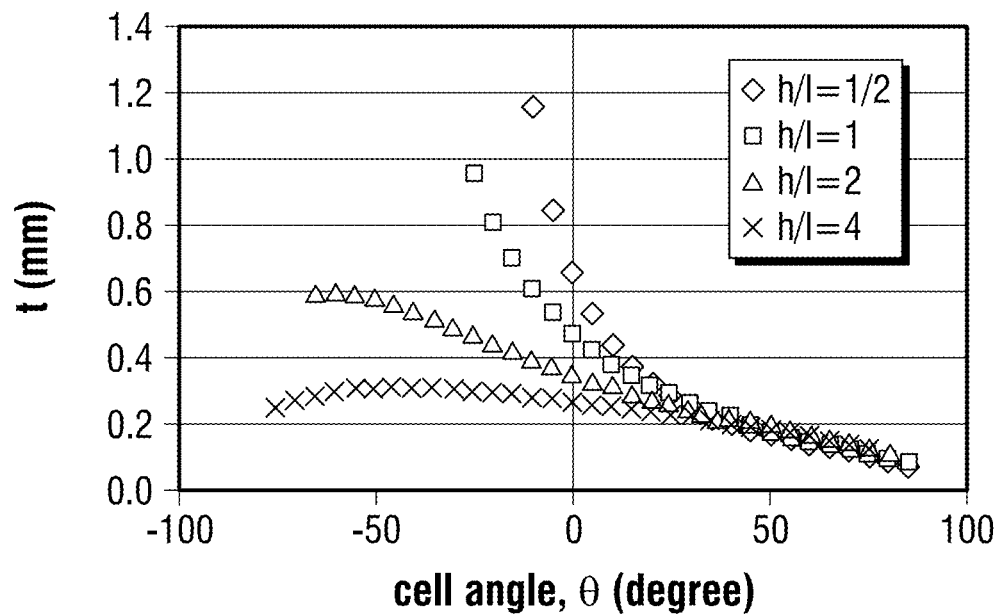

The corresponding cell wall thicknesses of honeycombs for a $G_{12}^*$ of 10 MPa are shown in FIG. 4(b) as a function of $\theta$ and $\alpha$. The cell wall thickness over a positive $\theta$ has a lower value than that of a negative $\theta$ due to the closely-packed cells for positive $\theta$. t increases with a negative $\theta$, but starts decreasing at $\theta=-60°$ and $-45°$ for $\alpha=2$ and 4, respectively. The angles are the transition points changing from expanding cell shapes to the contraction ones.

Figure 5A:
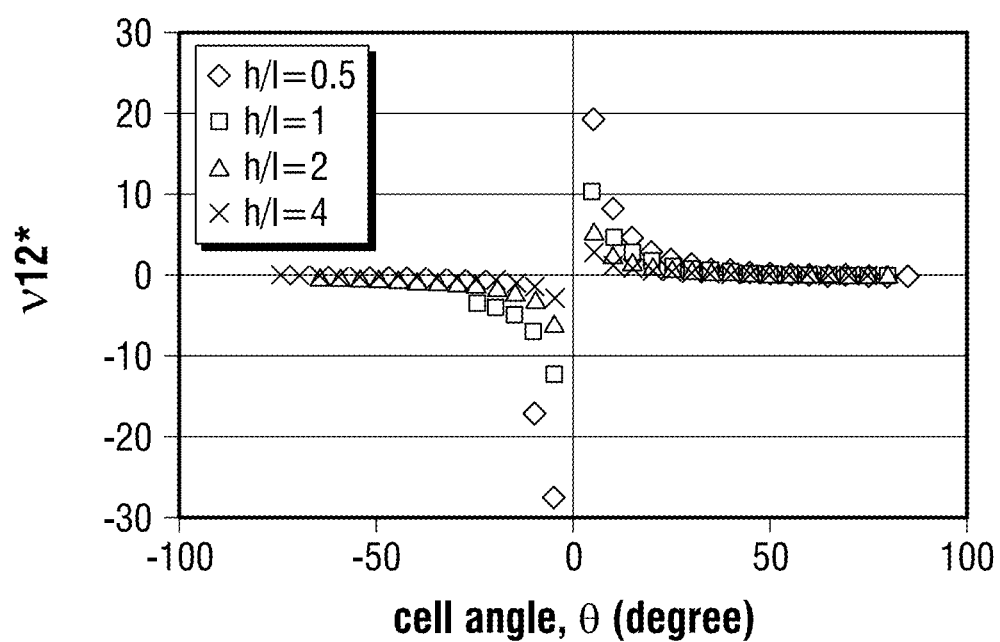
FIG. 5 shows graphs indicating the Effective Poisson's ratios of honeycombs as a function of cell angles and α(=h/l).
Figure 5B:
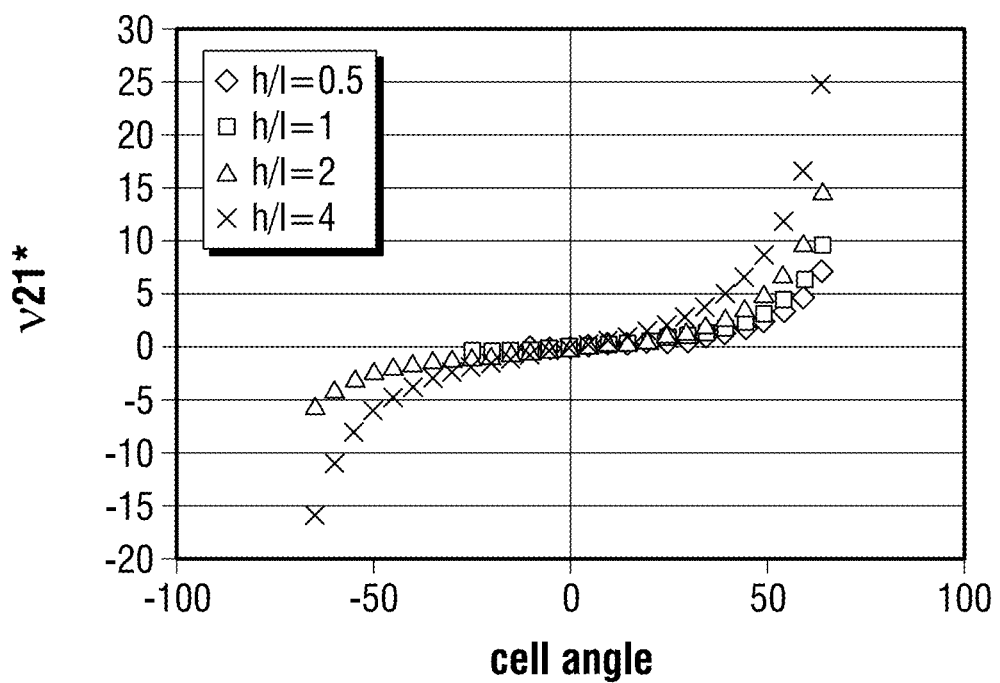

Effective Poisson's ratios as a function of e and a are shown in FIG. 5. In general, hexagonal honeycombs are not isotropic except for $\theta=30°$ with $\alpha=1$ and $-30°$ with $\alpha=2$; $v_{12}^*$ and $v_{21}^*$ of the honeycomb for $\theta=30°$ are 1 and $v_{12}^*$ and $v_{21}^*$ of the honeycombs for $\theta=-30°$ are $-1$. Both $v_{12}^*$ and $v_{21}^*$ have negative values over the negative cell angles. $v_{12}^*$ shows a singular value near $\theta=0°$ as shown in FIG. 5(a). However, $v_{21}^*$ shows a continuous value over the whole range of $\theta$.

Figure 6:
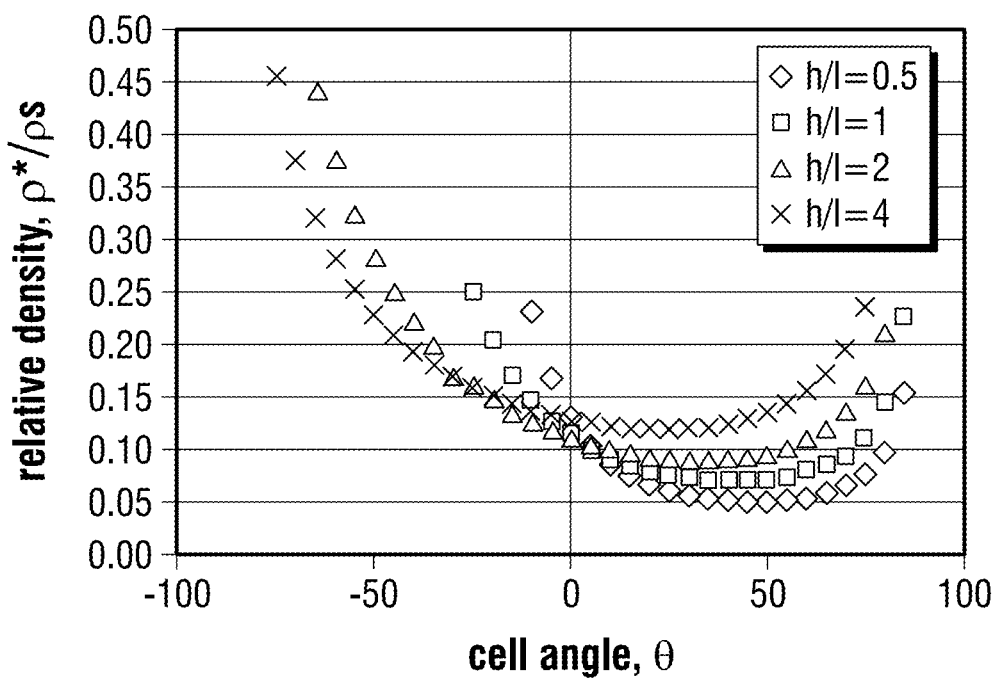
FIG. 6 is a graph showing the Relative density of honeycomb units as a function of θ and α (=h/l).

FIG. 6 shows relative density $(\rho^*/\rho_s)$ of honeycombs as a function of $\theta$ and $\alpha$. Generally, a honeycomb having a negative $\theta$ has a higher relative density than that of positive $\theta$ due to the higher t for a negative $\theta$ to meet the required $G_{12}^*$. A higher $\alpha(=h/l)$ shows a higher relative density over a positive e as shown in FIG. 6. However, a lower $\alpha$ shows a higher relative density over negative range of $\theta$. With 7075-T6 ($\rho_s=2800$ kg/m3) as a base material, honeycombs structures can be designed to have a density from about 140 to 1260 kg/m3.

Figure 7A:
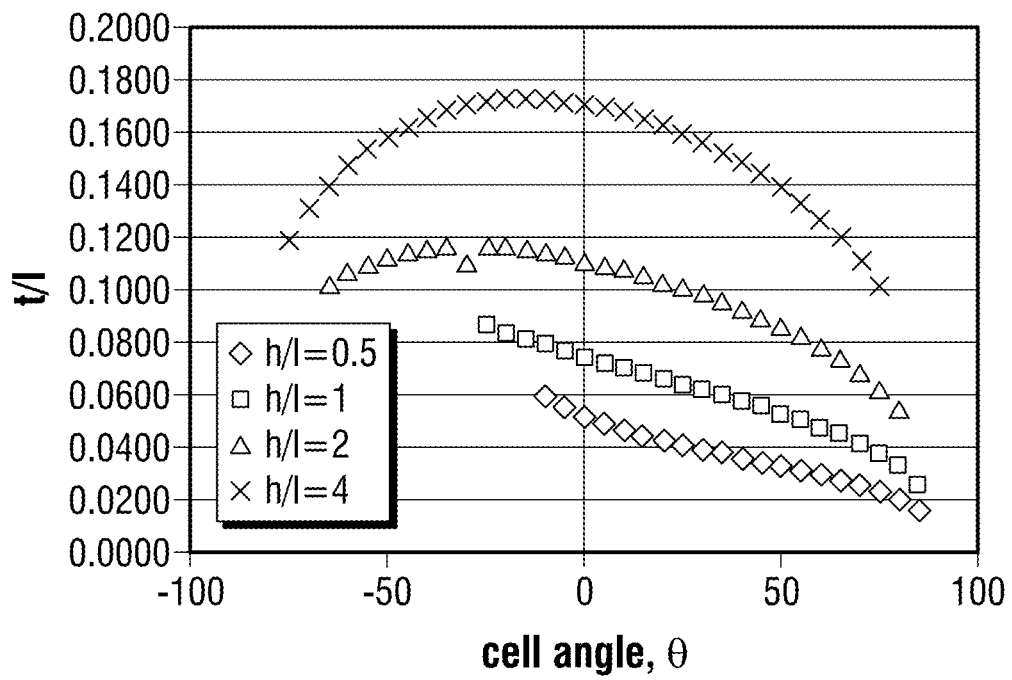
FIG. 7 is a graph showing t/l and t/h values as a function of θ and α (=h/l).
Figure 7B:
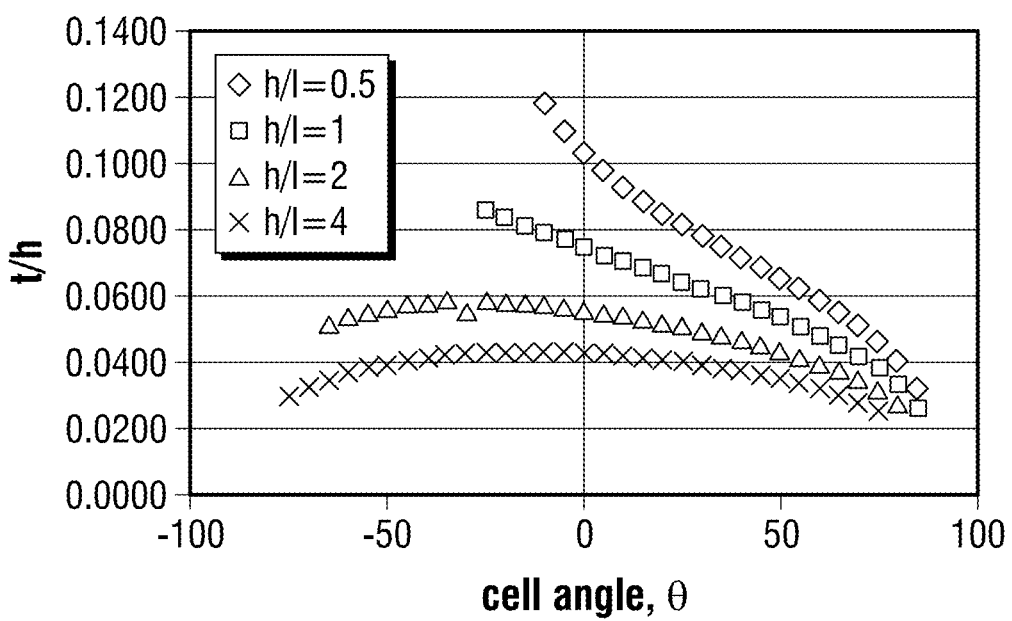

FIG. 7 shows t/l and t/l as a function of $\theta$ and $\alpha$ to make honeycombs have a $G_{12}^*$ of 10 MPa. At a higher $\alpha$, l has a lower value, resulting in a higher t/l as shown in FIG. 7(a). On the other hand, h has a higher value at a higher $\alpha$, resulting in a lower t/h as shown in FIG. 7(b).

Design of Shear Compliant Honeycomb Meso-Structures

Figure 8:
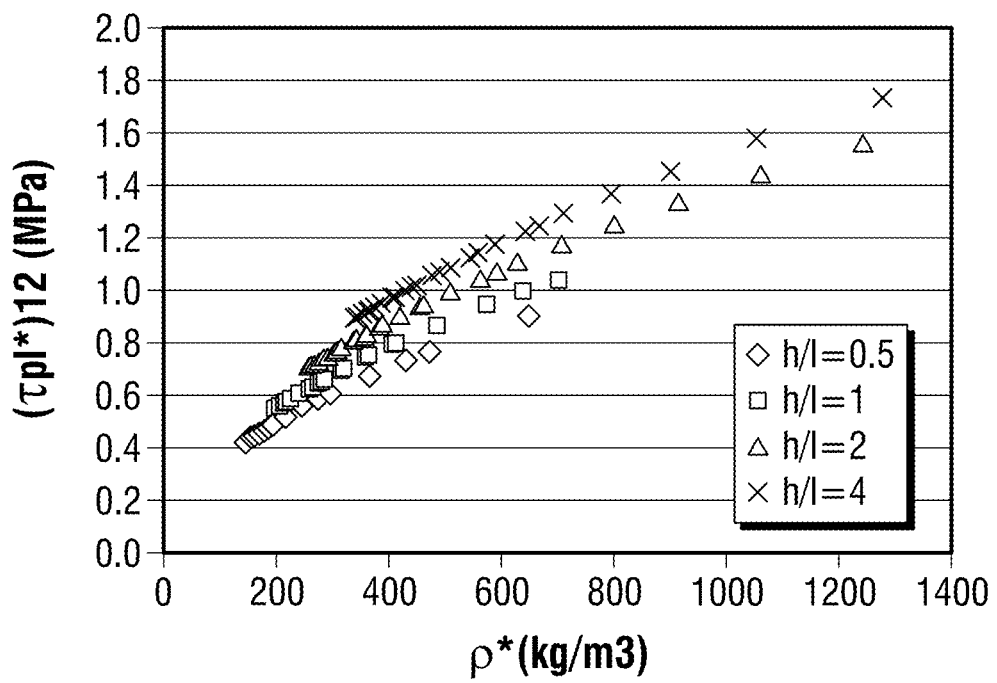
FIG. 8 is a graph showing the Effective shear plastic stress $(T_{pl}^*)_{12}$ as a function of ρ*.

Effective plastic shear strengths of 7075-T6 honeycombs as a function of density ($\rho^*$) and a are shown in FIG. 8. The corresponding cell wall thicknesses and cell angles have already been shown in FIG. 3 (b). A higher plastic shear strength is expected with a higher $\alpha$ with a higher NPR honeycombs, e.g., the maximum values of $(T_{pl}^*)_{12}$ of NPR honeycombs for $\alpha=2$ and 4 are about 1.6 and 1.8 MPa, respectively, when the honeycombs are designed to be a $G_{12}^*$ of 10 MPa. The higher NPR honeycombs have a high cell wall thickness which causes a high density.

Figure 9:
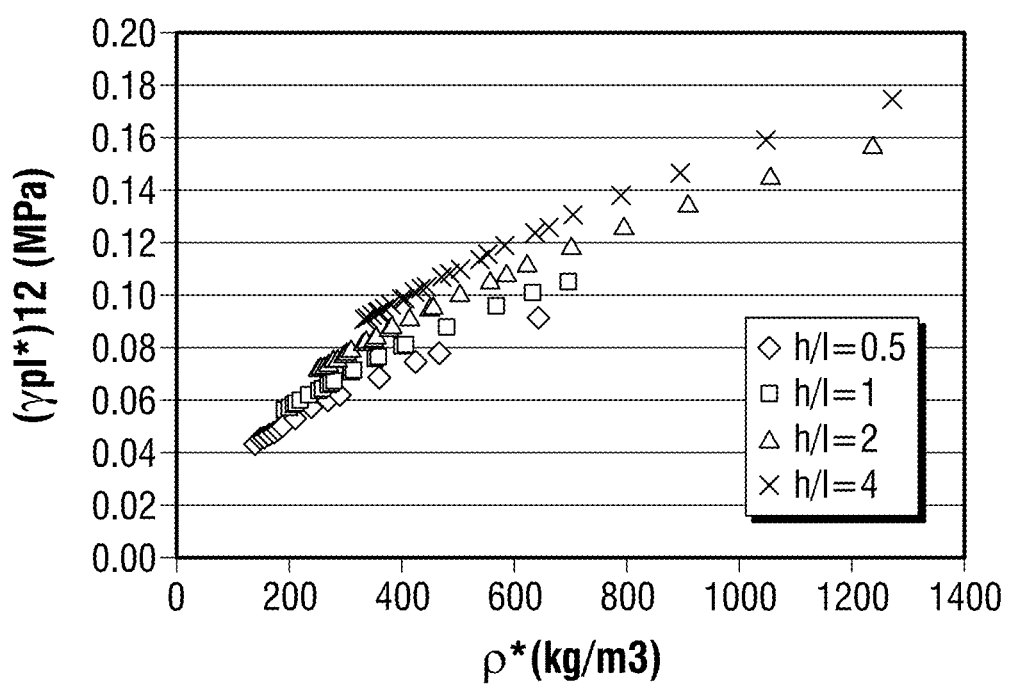
FIG. 9 shows the Effective shear plastic strain $(Y_{pl}^*)_{12}$ as a function of $\rho^*$.

The effective shear plastic strains can also be shown as a function of $\rho^*$ (FIG. 9). A higher a with NPR has a higher $(Y_{pl}^*)_{12}$, e.g., the maximum values of $(Y_{pl}^*)_{12}$ are about 0.16 and 0.18 for $\alpha=2$ and 4, respectively, when the honeycombs are designed to be a $G_{12}^*$ of 10 MPa. A NPR honeycomb with a high t show a high $(Y_{pl}^*)_{12}$, resulting in a high $\rho^*$ value; e.g., 0.25 mm.

Figure 10:
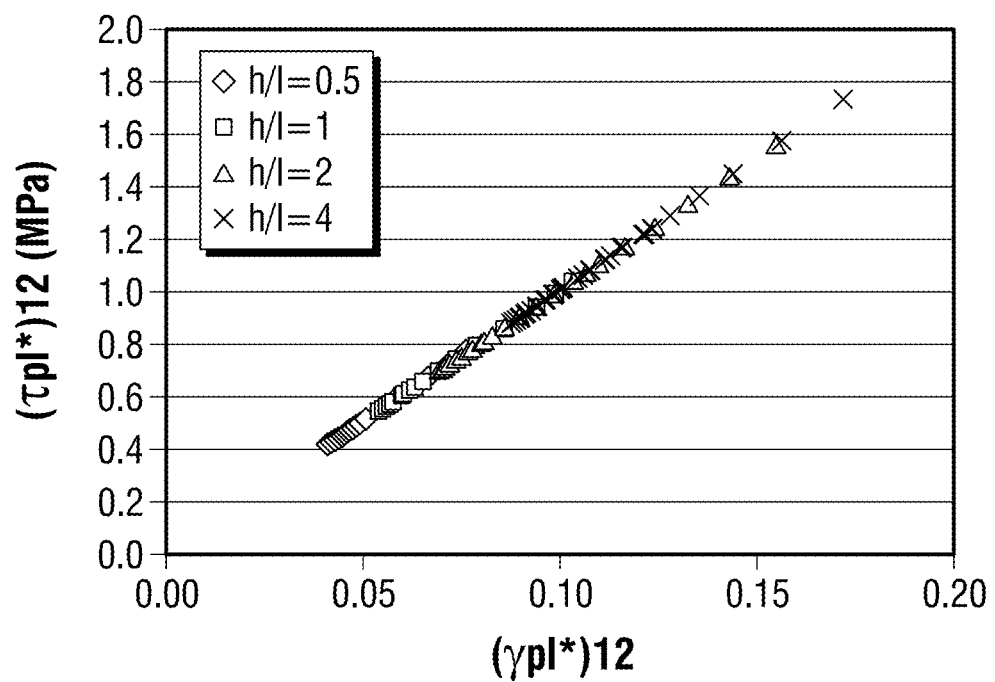
FIG. 10 shows the Effective maximum shear strain and shear strength.

When honeycombs are designed to have a $G_{12}^*$ of 10 MPa, effective shear strength and effective maximum shear strain are plotted for various a (FIG. 10). At a higher $\alpha$, the dual property—high shear strength and high effective shear strain are obtained. The re-entrant geometry with NPR shows the high dual target property. The higher cell wall thickness at a lower cell angle has cell walls avoid the elastic buckling. Therefore, NPR structures appear to be good to avoid the elastic buckling. The NPR structures' high cell wall thickness also appears to tend to avoid fracture.

CONCLUSION

Auxetic honeycombs having negative Poisson's ratio show lower effective shear modulus and higher maximum effective shear strain than the regular counterparts, which means that the auxetic honeycombs are candidate geometries for a shear flexure design.

INDUSTRIAL APPLICATIONS

As can be seen, the present invention provides a method for designing a suitable substitute for elastomeric materials such as rubber or polyurethane that are used in shear layer of a tire. Hence, a tire with lower mass, hysteresis and rolling resistance can be designed and manufactured quickly and effectively.

Figure 11:
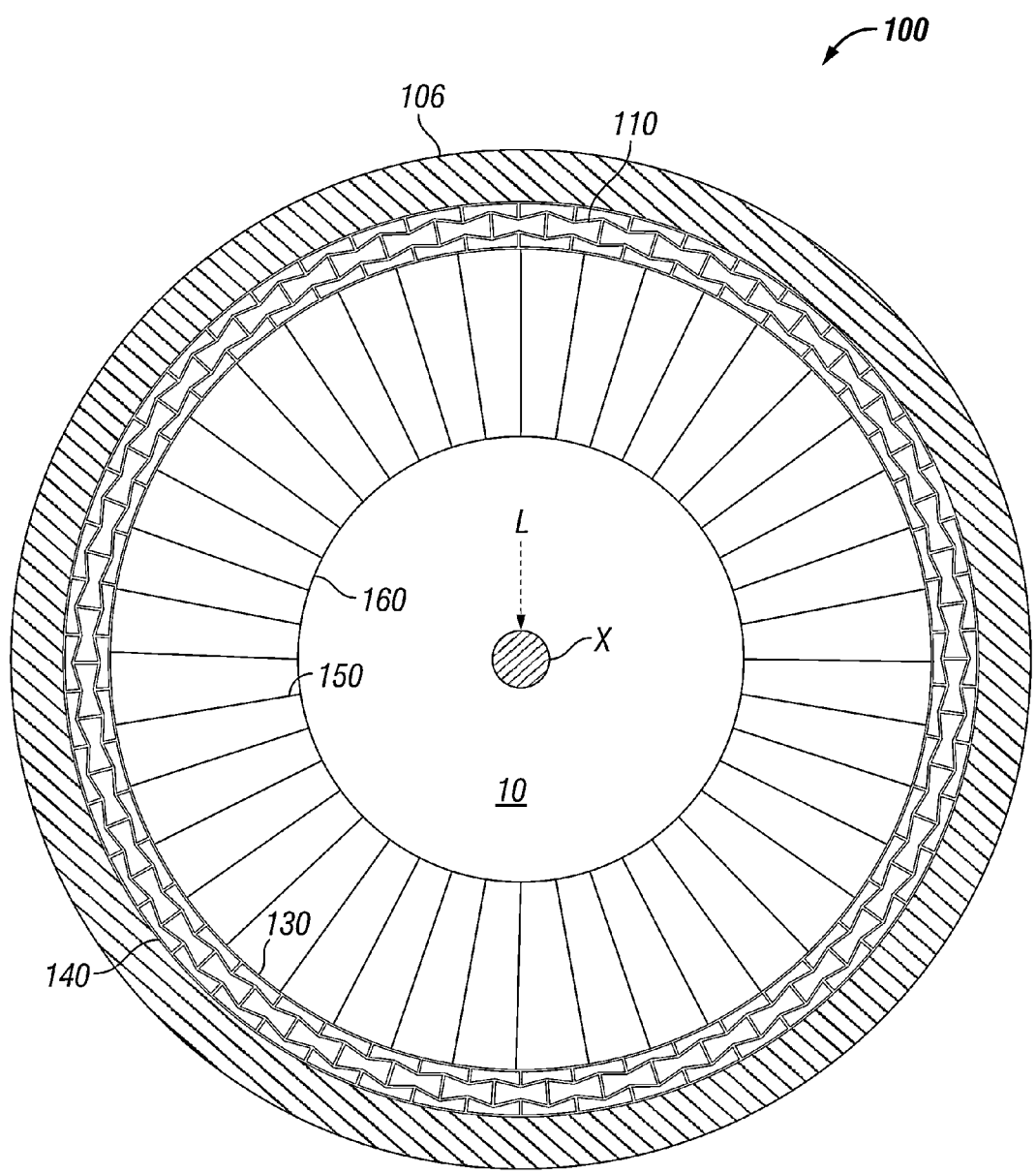
FIG. 11 is a front view of a tire that uses a Shear Layer having an Auxetic Honeycomb configuration made from an aluminum alloy.

Looking at FIG. 11, a the 100 having a rotational axis, X, in accordance with the design disclosed by U.S. Pat. No. 7,201,194 is shown having a reinforced annular band 110 that has a shear layer with an auxetic honeycomb design that is made from an aluminum alloy. On either side of the shear layer 110 are found inextensible membranes 130, 140. The reinforced annular band 110 is connected to the mounting band 160 by flexible spokes 150. The mounting band 160 in turn connects the tire to a hub or wheel 10. Also, a tread 106 is connected to the outward radial portion of the annular band 110. When the tire is loaded with a force or load, L, the tread and annular band will flatten (not shown) to create a pressure distribution in the contact patch of the tire that is similar to that found in a pneumatic tire that lacks such a shear layer or annular band. While these embodiments are shown using spokes as disclosed by U.S. Pat. No. 7,201,194, it is equally contemplated that the honeycomb structures could be used in embodiments with solid sidewalls such as is disclosed by U.S. Pat. No. 6,769,465. For a shear compliant structural design of honeycomb meso-structures, the layer height, H, of a honeycomb sample is chosen to be 0.5 inch (12.7 mm) in the x2 direction as shown in FIG. 1. This aligns with other design considerations of the structure that are outside the scope of this paper. Further, it allows for a refined design space in which to explore the influences of the defined honeycomb parameters on the effective meso-structural properties.

It should be understood that the present invention includes various other modifications that can be made to the exemplary embodiments described herein that come within the scope of the appended claims and their equivalents. These and other embodiments of the present invention are with the spirit and scope of the claims which follow.

REFERENCES

[1] Ju, J. D. Summers, J. Ziegert, and G. Fadel, 2009, Design of Honeycomb Meta-materials for High Shear Flexure, *In Proceedings of the ASME International Design Engineering Technical Conferences*, DETC2009-87730, San Diego, Calif.

[2] Abd El-Sayed, F. K., Jones, R., and Burgess, I. W. (1979), A Theoretical Approach to the Deformation of Honeycomb Based Composite Materials, Composites, vol. 10, no. 4, pp. 209-214.

[3] Gibson, L. J., Ashby, M. F., Schajer, G. S. and Robertson, C. I. (1982), The Mechanics of Two-Dimensional Cellular Materials, Proceedings of The Royal Society A, 382, pp. 25-42

[4] Masters, I. G. and Evans, K. E., (1996), "Models for the Elastic Deformation of Honeycombs," *Composite Structures*, vol. 35, no. pp. 403-22,

[5] Bezazi, A., Scarpa, F., and Remillat, C., (2005), "A Novel Centresymmetric Honeycomb Composite Structure," *Composite Structures*, vol. 71, no. 536-64,

[6] Balawi, S. and Abot, J. L., (2008), "A Refined Model for the Effective in-Plane Elastic Moduli of Hexagonal Honeycombs," *Composite Structures*, vol. 84, no. pp. 147-58,

[7] Gonella, S. and Ruzzene, M., (2008), "Homogenization and Equivalent in-Plane. Properties of Two Dimensional Periodic Lattices," *International Journal of Solid and Structures*, vol. 45, no. pp. 2897-915,

[8] Wang, A. J. and Mcdowell, D. L., (2004), "In-Plane Stiffness and Yield Strength of Periodic Metal Honeycombs," *Transactions of the ASME Journal of Engineering Materials and Technology*, vol. 126, no. pp. 137-56,

[9] Gellatry, R. A., Bijlaard, P. P., and Gallaherm, R. H., (1965), "Thermal Stress and Instability of Sandwich Cylinders on Rigid Supports," *Journal of Aircraft*, vol. 2, no. 1, pp. 44-8,

[10] Lin, W., (1996), "The Point Force Response of Sandwich Panels and Its Application to Impact Problems," in 37*th Structures, Structural Dynamics, and Materials Conference*, AIAA/ASME/ASCE/AHS/ASC, Salt Lake City, Utah April.

[11] Becker, W., (2000), "Closed-Form Analysis of the Thickness Effect of Regular Honeycomb Core Material," *Composite Structures*, vol. 48, pp. 67-70,

[12] Kapania, R. K., Soliman, H. E., Vasudeva, S., Hughes, O., and Makjecha, D. P., (2008), "Static Analysis of Sandwich Panels with Square Honeycomb Core," *AIAA Journal* vol. 46, no. 3, pp. 627-34,

[13] Abdelal, G. F. and Atef, A., (2008), "Thermal Fatigue Analysis of Solar Panel Structure for Micro-Satellite Applications," *International Journal of Mechanics and Materials in Design*, vol. 4, no. pp. 53-62,

[14] Lakes, R., Foam Structures with a Negative Poisson's Ratio, Science, 1987, 235(4792), pp. 1038-1040

[15] J. Ju, J. D. Summers, J. Ziegert, and G. Fadel, 2009, Nonlinear Elastic Constitutive Relations on Auxetic Honeycombs, In *Proceedings of the ASME International Mechanical Engineering Congress and Exposition*, IMECE2009-12654, Lake Buena Vista, Fla.

[16] Olympio, K. R. and Gandhi, F., (2007), "Zero-Nu Cellular Honeycomb Flexible Skins for One-Dimensional Wing Morphing," in 48*th Structures, Structural Dynamics, and Materials Conference*, AIAA/ASME/ASCE/AHS/ASC, Honolulu, Hi. April 23-26.

[17] Bubert, E. A., Woods, B. K. S., Kothera, C. S., and Wereley, N. M., (2008), "Design and Fabrication of a Passive 1D Morphing Aircraft Skin," in 49*th Structures, Structural Dynamics, and Materials Conference*, AIAA/ASME/ASCE/AHS/ASC, Schaumburg, Ill. April 7-10.

[18] Larsen U D, Sigmund, O, Bouwstra S. (1997), Design and fabrication of compliant micromechanisms and structures with negative Poisson's ratio, *Journal of Microelectromechanical Systems*, 6(2):99-106.

[19] Lan, L-H and Fu, M-H, (2009), Nonlinear Constitutive Relations of Cellular Materials, *AIAA Journal*, 47(1), pp. 264-270.

[20] Ashby, M. F., (1999), *Materials Selection and Process in Mechanical Design*: Butterworth-Heinermann

[21] Thompson, S. C., Muchnick, H. M., Choi, H. J. McDowell, D., (2006), Robust Materials Design of Blast Resistant Panels, In Proceedings of the 11th AIAA/ISSMO Multidisciplinary Analysis and Optimization Conference, Portsmouth, Va.

What is claimed is:

1. An apparatus comprising a tire that includes a shear band with a shear layer, said shear layer comprising units having an auxetic configuration wherein the units are constructed from materials selected from aluminum or titanium alloys.

2. The apparatus of claim 1, wherein the units are constructed from a 7075-T6 aluminum alloy.

3. The apparatus of claim 1, wherein the units are constructed from a 6Al-4V titanium alloy.

4. The apparatus of claim 1, wherein the units have an angle $\alpha$ of $-10°$.

* * * * *